US009464773B2

(12) United States Patent
Geisler et al.

(10) Patent No.: US 9,464,773 B2
(45) Date of Patent: Oct. 11, 2016

(54) ILLUMINATED LIGHT DUCT JOINT

(71) Applicant: 3M INNOVATIVE PROPERTIES COMPANY, St. Paul, MN (US)

(72) Inventors: Karl J. L. Geisler, St. Paul, MN (US); David G. Freier, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/770,303

(22) PCT Filed: Apr. 4, 2014

(86) PCT No.: PCT/US2014/032944
§ 371 (c)(1),
(2) Date: Aug. 25, 2015

(87) PCT Pub. No.: WO2014/168823
PCT Pub. Date: Oct. 16, 2014

(65) Prior Publication Data
US 2016/0084458 A1    Mar. 24, 2016

Related U.S. Application Data

(60) Provisional application No. 61/810,763, filed on Apr. 11, 2013.

(51) Int. Cl.
*F21S 11/00*    (2006.01)
*F21S 8/02*    (2006.01)
(Continued)

(52) U.S. Cl.
CPC ............ *F21S 11/007* (2013.01); *F21S 8/026* (2013.01); *F21V 7/22* (2013.01); *G02B 6/0096* (2013.01);
(Continued)

(58) Field of Classification Search
CPC ..... F21S 11/00; F21S 11/007; G02B 27/108; G02B 6/0096

USPC .......................... 359/595, 597, 592
See application file for complete search history.

(56) References Cited

U.S. PATENT DOCUMENTS 247,229 A    9/1881    Wheeler
1,837,091 A    12/1931    Adams
(Continued)

FOREIGN PATENT DOCUMENTS

JP    2008-287920    11/2008
WO    WO 99-47851    9/1999
(Continued)

OTHER PUBLICATIONS

International Search Report for PCT International Application No. PCT/US2014/032944 mailed on Jul. 3, 2014, 5 pages.

*Primary Examiner* — Christopher Mahoney

(57) ABSTRACT

The present disclosure provides a novel construction for an illuminated light splitter in a mirror-lined light duct. In particular, the present disclosure addresses the ability to split partially collimated light travelling through a light duct into two different light ducts using light diverters, while extracting a portion of the light from each of the light ducts and also from the common intersection region. In some cases, the visual appearance of the illumination in the intersection region can appear non-uniform due to the presence of the light diverters, and the present disclosure provides an illuminated light duct splitter (100, 200, 300) configuration that homogenizes the output from the illuminated duct within the intersection region (117, 217, 317).

24 Claims, 4 Drawing Sheets

(51) Int. Cl.
*F21V 7/22* (2006.01)
*F21V 8/00* (2006.01)
*G02B 27/10* (2006.01)
*F21Y 105/00* (2016.01)

(52) U.S. Cl.
CPC .......... G02B 27/106 (2013.01); G02B 27/108 (2013.01); *F21V 2200/00* (2015.01); *F21Y 2105/00* (2013.01)

(56) References Cited

U.S. PATENT DOCUMENTS

| | | | |
|---|---|---|---|
| 4,078,852 A | 3/1978 | Lebduska | |
| 4,152,752 A | 5/1979 | Niemi | |
| 4,411,490 A | 10/1983 | Daniel | |
| 4,459,642 A * | 7/1984 | Mori | F21S 11/00 359/595 |
| 4,740,048 A * | 4/1988 | Mori | A01G 7/045 359/592 |
| 4,758,930 A | 7/1988 | Pomares | |
| 4,850,665 A * | 7/1989 | Whitehead | G02B 6/4298 362/308 |
| 4,956,759 A | 9/1990 | Goldenberg et al. | |
| 5,988,843 A | 11/1999 | Händel | |
| 6,024,475 A | 2/2000 | Kufrovich et al. | |
| 6,149,289 A | 11/2000 | Kuramitsu et al. | |
| 6,422,761 B1 | 7/2002 | Naghski et al. | |
| 6,819,687 B1 | 11/2004 | Fein | |
| 7,147,903 B2 | 12/2006 | Ouderkirk et al. | |
| 8,251,527 B1 | 8/2012 | Freier | |
| 8,905,586 B2 * | 12/2014 | O | F21S 11/00 359/598 |
| 9,116,326 B2 * | 8/2015 | McCluney | F21S 11/00 |
| 2005/0220680 A1 | 10/2005 | Ma et al. | |
| 2012/0057350 A1 | 3/2012 | Freier et al. | |

FOREIGN PATENT DOCUMENTS

| | | |
|---|---|---|
| WO | WO 2010-075357 | 7/2010 |
| WO | WO 2012-051625 | 4/2012 |
| WO | WO 2012-138503 | 10/2012 |
| WO | WO 2012-138595 | 10/2012 |
| WO | WO 2012-144268 | 10/2012 |
| WO | WO 2013-106365 | 7/2013 |
| WO | WO 2013-165694 | 11/2013 |
| WO | WO 2014-070495 | 5/2014 |
| WO | WO 2014-070498 | 5/2014 |

* cited by examiner

ILLUMINATED LIGHT DUCT JOINT

BACKGROUND

The long-distance transport of visible light through a building can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (i.e., air) that leads to both lower attenuation and longer lifetimes, and a potentially lower weight per unit of light flux transported.

SUMMARY

The present disclosure provides a novel construction for an illuminated light splitter in a mirror-lined light duct. In particular, the present disclosure addresses the ability to split partially collimated light travelling through a light duct into two different light ducts using light diverters, while extracting a portion of the light from each of the light ducts and also from the common intersection region. In some cases, the visual appearance of the illumination in the intersection region can appear non-uniform due to the presence of the light diverters, and the present disclosure provides an illuminated light duct splitter configuration that homogenizes the output from the illuminated duct within the intersection region.

In one aspect, the present disclosure provides an illuminated light duct splitter that includes a first light conduit defining a light transport cavity capable of transporting light along a first propagation direction; a second light conduit defining a first light diversion cavity and a second propagation direction perpendicular to the first propagation direction; a third light conduit defining a second light diversion cavity and a third propagation direction parallel and opposite the second propagation direction, the second and the third light conduit intersecting the first light conduit such that the light transport cavity and the first and the second light diversion cavities are contiguous in an intersection region; and a light diverter disposed at a diverter angle to the first propagation direction and parallel to the second and the third propagation direction, the light diverter capable of reflecting incident light propagating within the collimation angle $\theta$ of the first propagation direction to intersect a bottom surface of the intersection region.

In another aspect, the present disclosure provides an illuminated light duct splitter that includes a first light conduit defining a light transport cavity capable of transporting light along a first propagation direction; a second light conduit defining a first light diversion cavity; and a third light conduit defining a second light diversion cavity, the second and the third light conduit intersecting the first light conduit such that the light transport cavity and the first and the second light diversion cavities are contiguous in an intersection region. The illuminated light duct splitter further includes a light diverter having a first reflector disposed at a first diverter angle to the first propagation direction; a second reflector disposed at a second diverter angle to the first propagation direction, the first and the second reflectors intersecting at a first edge; and a third reflector perpendicular to the first and second reflector and at a third diverter angle to the first propagation direction, intersecting a bottom surface of the intersection region and the first edge. A first light ray propagating within a collimation angle $\theta$ of the first propagation direction that intersects the first reflector is diverted to a second light ray propagating within the collimation angle $\theta$ of a second propagation direction in the second light conduit, a third light ray propagating within the collimation angle $\theta$ of the first propagation direction that intersects the second reflector is diverted to a fourth light ray propagating within the collimation angle $\theta$ of a third propagation direction in the third light conduit, and a fifth light ray propagating within the collimation angle $\theta$ of the first propagation direction that intersects the third reflector is diverted to a sixth light ray intersecting the bottom surface of the intersection region.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
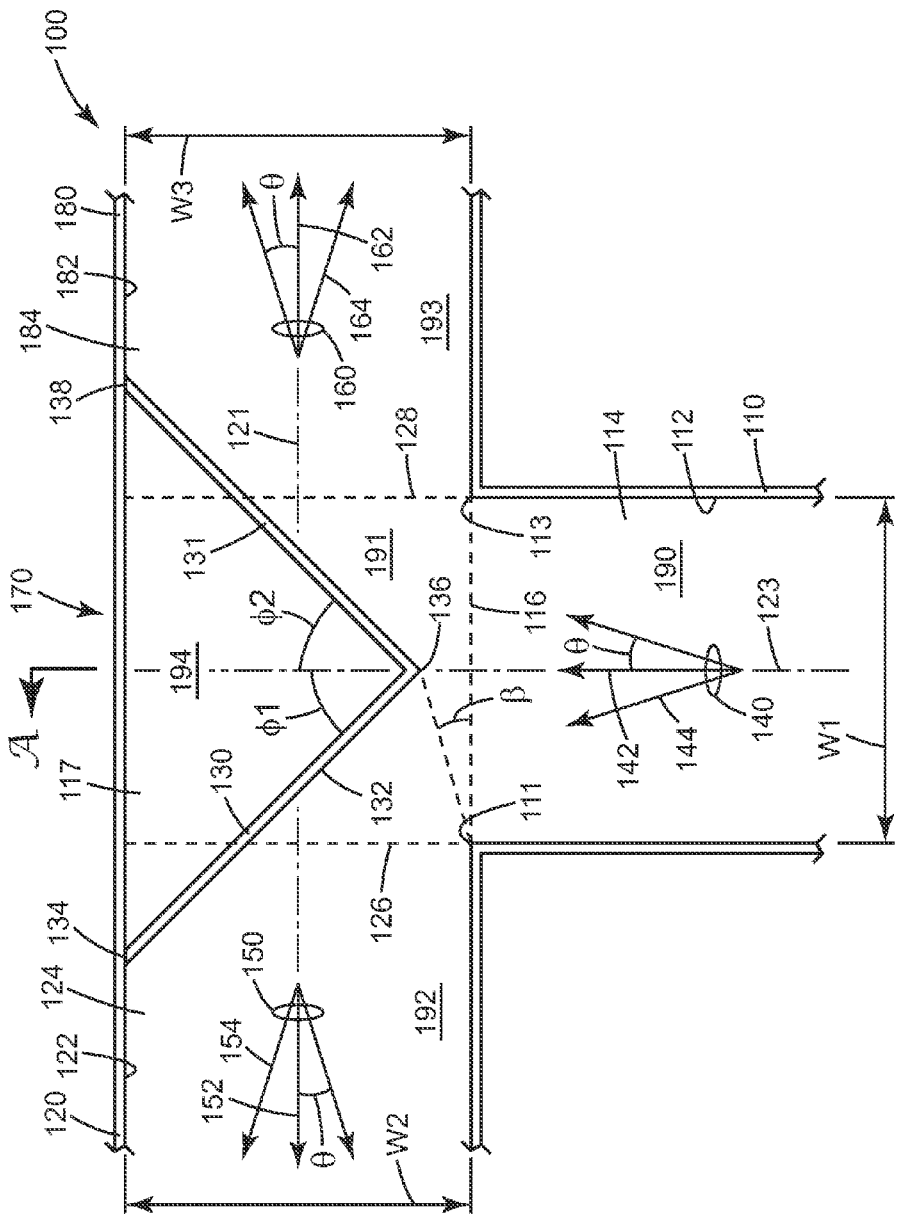
FIG. 1 shows an overhead cross-sectional schematic of a light duct splitter.

The present disclosure provides a novel construction for an illuminated light splitter in a mirror-lined light duct. In particular, the present disclosure addresses the ability to split partially collimated light travelling through a light duct into two different light ducts using light diverters, while extracting a portion of the light from each of the light ducts and also from the common intersection region. In some cases, the visual appearance of the illumination in the intersection region can appear non-uniform due to the presence of the light diverters, and the present disclosure provides an illuminated light duct splitter configuration that homogenizes the output from the illuminated duct within the intersection region.

Techniques and apparatus used to extract and distribute light from light ducts has been described, for example, in U.S. Pat. No. 8,251,527 entitled LIGHT DUCT BEND; Patent Publication Nos. US2012/0057350 entitled SWITCHABLE LIGHT DUCT EXTRACTION; WO2012/138503 entitled LIGHT DUCT TEE EXTRACTOR; WO2012/138595 entitled LIGHT DUCT TEE SPLITTER; and U.S. Patent Application No. 61/641,405 entitled RACK MOUNTED LIGHT, filed May 2, 2012.

The described illuminated light duct splitter can be generally applied to rectangular light ducts that intersect in a "Tee" configuration, such as those described in PCT Patent Publication No. WO2012/138595 entitled LIGHT DUCT TEE SPLITTER. In some cases, light can be extracted from both the top and the bottom portions of the light ducts and also from the common intersection region. In one particular embodiment, the light duct can be most effective by using very high efficiency mirrors lining the interior surface of the duct such as, for example, Vikuiti™ Enhanced Specular Reflector (ESR) film available from 3M Company. ESR film can be readily bent about a single axis of curvature, such as the curvatures common in rectangular cross-section light ducts.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

In one particular embodiment, the light injected into the light duct is partially collimated light due to the method of light generation. This partially collimated light can generally be described as being included within a cone having border light rays within a collimation angle θ of the central light propagation direction.

Generally, the collimation angle θ of light injected into the light duct should be restricted to no greater than about 30 degrees, or no greater than about 25 degrees, or no greater than about 20 degrees, or even no greater than about 15 degrees. In one particular embodiment, the collimation angle θ can be about 18.4 degrees. The accuracy of the various optical components for injecting the light into the duct can contribute to the resulting collimation angle θ.

FIG. 1 shows an overhead cross-sectional schematic of a light duct splitter 100, according to one aspect of the disclosure. In one particular embodiment, light duct splitter 100 can be described as a light duct "Tee" splitter, since the light ducts intersect in a T-shape. Light duct splitter 100 includes a first light conduit 110 that defines a light transport cavity 114 that is capable of transporting an input light 140 along a first propagation direction 142. Light duct splitter 100 further includes a second light conduit 120 that defines a first light diversion cavity 124 that is capable of transporting a second light 150 along a second propagation direction 152. Light duct splitter 100 still further includes a third light conduit 180 that defines a second light diversion cavity 184 that is capable of transporting a third light 160 along a third propagation direction 162. In one particular embodiment, second light conduit 120 and third light conduit 180 can include ducts having the same cross-sectional area, and the Tee splitter can be symmetric around the central axis 123 of the first light conduit 110.

The second and the third light conduits 120, 180, intersect the first light conduit 110 such that the light transport cavity 114 and the first and the second light diversion cavities 124, 184, are contiguous and form an intersection region 117 defined by an output cross section 116 of the first light conduit 110, a first input cross section 126 of the second light conduit 120, and a second input cross section 128 of the third light conduit 180. The intersection region 117 is further defined by a first corner 111 at an intersection of the first light conduit 110 and the second light conduit 120, and also a second corner 113 at an intersection of the first light conduit 110 and the third light conduit 180. The output cross section 116 can have a first light conduit width W1, and the first and second input cross sections 126, 128, can have widths W2, W3, respectively, that are all the same, or they can each be different.

In one particular embodiment, first propagation direction 142 is located along the same direction as a central axis 123 of the first light conduit 110. Input light 140 is partially collimated light travelling along the first propagation direction 142, and includes light within a collimation angle θ; i.e., all of the input light 140 is included in a cone of light centered on the first propagation direction 142 and having boundary light rays 144 at the collimation angle θ. In some cases, input light 140 can originate from sunlight which is collected and concentrated before being injected into the first light conduit 110. In some cases, input light can be "artificial light" generated by any known technique such as halogen lamps, arc lamps, light emitting diodes (LEDs), incandescent lamps, and the like.

A light diverter 170 extends between the light transport cavity 114 and the first and second light diversion cavities 124, 184. The light diverter 170 includes a first reflector 130 disposed at a first diverter angle φ1 to the first propagation direction 142, and a second reflector 131 disposed at a second diverter angle φ2 to the first propagation direction 142. For Tee-shaped light ducts having light propagation directions along the axis of each duct as shown in FIG. 1, the first and second diverter angles φ1 and φ2 are each generally equal to 45 degrees. The first and the second reflectors 130, 131, intersect each other at a first edge 136, disposed in intersection region 117. Each of the first and second reflectors 130, 131, also include a second edge 134, 138, that is disposed in the first and second light diversion cavities 124, 184, outside of intersection region 117, respectively. In one particular embodiment, each of the second edges 134, 138, can be positioned immediately adjacent the respective second and third light conduits 120, 180.

The relationship between the collimation angle θ of the input light 140, the relative width of each of the first light conduit 110, the second light conduit 120, and the third light conduit 180, the position of the first edge 136 (i.e., angle β), and the position of the second edges 134, 138, for 100 percent light splitting efficiency can be calculated from the geometry of the system, as known to one of skill in the art. In one particular embodiment, the limiting relationships for the case where second propagation direction 152 and third propagation direction 162 are parallel to each other and both are perpendicular to first propagation direction 142 are given by the relationships $$W_2 \geq \frac{W_1}{2}\left(\frac{1+\tan(\beta)}{1-\tan(\theta)}\right) \text{ and } W_3 \geq \frac{W_1}{2}\left(\frac{1+\tan(\beta)}{1-\tan(\theta)}\right)$$

for θ<45 degrees and β≥θ. The light diverter 170 can be positioned within the light duct splitter 100 such that, geometrically, 100 percent splitting efficiency can be achieved for any light intercepting the light diverter (reduced only by any small amount of absorbance or scattering from the highly efficient reflectors), as described elsewhere.

Generally, input light 140 propagating within a collimation angle θ of the first propagation direction 142 that intersects the reflective surface 132 of the first reflector 130 is diverted to a second light 150 propagating within the collimation angle θ of a second propagation direction 152 in the second light conduit 120. Further, input light 140 propagating within the collimation angle θ of the first propagation direction 142 that intersects the reflective surface 132 of the second reflector 131 is diverted to a third light 160 propagating within the collimation angle θ of a third propagation direction 162 in the third light conduit 180.

In one particular embodiment, at least one of the light duct surfaces of each of the first light conduit 110, second light conduit 120, third light conduit 180, and intersection region 117 can include light extraction elements to redirect a portion of the light intersecting that surface to be directed to the exterior of the light duct. In some cases, at least one of a first conduit bottom surface 190, a second conduit bottom surface 192, a third conduit bottom surface 193, a first intersection region bottom surface 191, and a second intersection region bottom surface 194, can include light extraction elements.

Light extraction and re-direction from the common intersection region, as well as from the first light conduit 110, second light conduit 120, third light conduit 180, and intersection region 117 that extend from the "Tee", can be accomplished using a combination of perforated ESR having a plurality of voids, optional turning films having a parallel vee-grooved structured surface, and optional steering films having either planar or lenticular parallel surfaces such as those described in, for example, U.S. Patent Application No. 61/720,118 entitled RECTANGULAR LIGHT DUCT EXTRACTION (filed Oct. 30, 2012), the disclosure of which is herein incorporated in its entirety.

For those devices designed to transmit light from one location to another, such as a light duct, it is desirable that the optical surfaces absorb and transmit a minimal amount of light incident upon them while reflecting substantially all of the light. In portions of the device, it may be desirable to deliver light to a selected area using generally reflective optical surfaces and to then allow for transmission of light out of the device in a known, predetermined manner. In such devices, it may be desirable to provide a portion of the optical surface as partially reflective to allow light to exit the device in a predetermined manner, as described herein.

Where multilayer optical film such as ESR is used in any optical device, it will be understood that it can be laminated to a support (which itself may be transparent, opaque reflective or any combination thereof) or it can be otherwise supported using any suitable frame or other support structure because in some instances the multilayer optical film itself may not be rigid enough to be self-supporting in an optical device.

Generally, the combination of the positioning and distribution of the plurality of voids, the structured surface of the turning film, and the structured surface of the steering film can be independently adjusted to control the direction and collimation of the light beams exiting through the light duct extractor. Control of the emission in the down-duct direction can be influenced by the distribution of the plurality of voids and the structure of the turning film disposed adjacent the plurality of voids. Control of the emission in the cross-duct direction can also be influenced by the distribution of the plurality of voids, and the structure of the steering film disposed adjacent the turning film.

In one particular embodiment, partially collimated light beams propagating through the duct include a cone of light having a propagation direction within an input light divergence angle θ (i.e., a collimation half-angle θ) from a central light ray. The divergence angle θ of a partially collimated light beam can be symmetrically distributed in a cone around the central light ray, or it can be non-symmetrically distributed. In some cases, the divergence angle θ of partially collimated light beam can range from about 0 degrees to about 30 degrees, or from about 0 degrees to about 25 degrees, or from about 0 degrees to about 20 degrees, or even from about 0 degrees to about 15 degrees. In one particular embodiment, the divergence angle θ of a partially collimated light beam can be about 23 degrees.

Partially collimated light rays are injected into the interior of the light duct along the direction of the axis of the light duct. A perforated reflective lining of the light duct (e.g., perforated 3M Enhanced Specular Reflector (ESR) film) lines the light duct in regions where light extraction is desired. Generally, the reflective lining of ESR is at least 98 percent reflective at most visible wavelengths, with no more than 2 percent of the reflected light directed more than 0.5 degrees from the specular direction.

A light ray which strikes the ESR between perforations is specularly reflected and returned to the light duct within the same cone of directions as the incident light. A light ray which strikes within a perforation passes through the ESR with no change in direction. (Note that the dimensions of the perforations within the plane of the ESR are assumed large relative to its thickness, so that very few rays strike the interior edge of a perforation.) The probability that a ray strikes a perforation and therefore exits the light duct is proportional to the local percent open area of the perforated ESR. Thus, the rate at which light is extracted from the light duct can be controlled by adjusting this percent open area.

The half angle of light extracted from the light duct in the circumferential direction is comparable to the half angle of collimation within the light duct. The half angle in the longitudinal direction is approximately one-half the half angle within the light duct; i.e., only half of the directions immediately interior to the ESR have the opportunity to escape through a perforation. Thus, the precision of directing the light in a desired direction increases as the half angle within the light duct decreases.

Light rays that pass through a perforation next encounter a prismatic turning film. The light rays strike the prisms of the turning film in a direction substantially parallel to the plane of the turning film and perpendicular to the axes of the prisms—the divergence of their incidence from this norm is dictated by the collimation within the light duct. A majority of these rays enter the film by refracting through the first prism face encountered, then undergoing total internal reflection (TIR) from the opposing face, and finally refract through the bottom of the film. There is no net change in the direction of propagation perpendicular to the axis of the light duct. The net change in direction along the axis of the light duct can be readily calculated by using the index of refraction of the turning film prism material and the included angle of the prisms. In general these are selected to yield an angular distribution of transmission centered about the downward normal to the film. Since most rays are transmitted, very little light is returned to the light duct, facilitating the maintenance of collimation within the light duct.

Light rays that pass through the turning film can next encounter a decollimation film or plate (also referred to as a steering film). The rays encountering the steering film strike the structured surface of this film substantially normal to the plane of the film. The majority of these pass through the structured surface, are refracted into directions determined by the local slope of the structure, and pass through the bottom surface. For these light rays, there is no net change in the direction of propagation along the axis of the light duct. The net change in direction perpendicular to the axis is determined by the index of refraction and the distribution of surface slopes of the structure. The steering film structure can be a smooth curved surface such as a cylindrical or aspheric ridge-like lens, or can be piecewise planar, such as to approximate a smooth curved lens structure. In general the steering film structures are selected to yield a specified distribution of illuminance upon target surfaces occurring at distances from the light duct large compared to the cross-duct dimension of the emissive surface. Again, since most rays are transmitted, very little light is returned to the light duct, preserving the collimation within the light duct.

In many cases the turning film and steering film, if present, may use a transparent support plate or tube surrounding the light duct (depending on the light duct configuration). In one particular embodiment, the transparent support can be laminated to the outermost film component, and can include an anti-reflective coating on the outermost surface. Both lamination and AR coats increase transmission through and decrease reflection from the outermost component, increasing the overall efficiency of the lighting system, and better preserving the collimation within the light duct.

The plurality of voids can be made to have any desired percent open (i.e., non-reflective) area from about 5% to about 95%. In one particular embodiment, the percent open area ranges from about 5% to about 60%, or from about 10% to about 50%. The size range of the individual voids can also vary, in one particular embodiment, the voids can range in major dimension from about 0.5 mm to about 5 mm, or from about 0.5 mm to about 3 mm, or from about 1 mm to about 2 mm.

In some cases, the voids can be uniformly distributed across the extraction surface and can have a uniform size. However, in some cases, the voids can have different sizes and distributions, and can result in a variable areal distribution of void (i.e., open) across the light output region. The plurality of voids can optionally include switchable elements (not shown) that can be used to regulate the output of light from the light duct by changing the void open area gradually from fully closed to fully open, such as those described in, for example, U.S. Patent Publication No. US2012-0057350 entitled, SWITCHABLE LIGHT-DUCT EXTRACTION.

The voids can be physical apertures that may be formed by any suitable technique including, for example, die cut, laser cut, molded, formed, and the like. The voids can instead be transparent windows that can be provided of many different materials or constructions. The areas can be made of multilayer optical film or any other transmissive or partially transmissive materials. One way to allow for light transmission through the areas is to provide areas in optical surface which are partially reflective and partially transmissive. Partial reflectivity can be imparted to multilayer optical films in areas by a variety of techniques.

In one aspect, areas may comprise multi-layered optical film which is uniaxially stretched to allow transmission of light having one plane of polarization while reflecting light having a plane of polarization orthogonal to the transmitted light, such as described, for example, in U.S. Pat. No. 7,147,903 (Ouderkirk et al.), entitled "High Efficiency Optical Devices". In another aspect, areas may comprise multi-layered optical film which has been distorted in selected regions, to convert a reflective film into a light transmissive film. Such distortions can be effected, for example, by heating portions of the film to reduce the layered structure of the film, as described, for example, in PCT Publication No. WO2010075357 (Merrill et al.), entitled "Internally Patterned Multilayer Optical Films using Spatially Selective Birefringence Reduction".

The selective birefringence reduction can be performed by the judicious delivery of an appropriate amount of energy to the second zone so as to selectively heat at least some of the interior layers therein to a temperature high enough to produce a relaxation in the material that reduces or eliminates a preexisting optical birefringence, but low enough to maintain the physical integrity of the layer structure within the film. The reduction in birefringence may be partial or it may be complete, in which case interior layers that are birefringent in the first zone are rendered optically isotropic in the second zone. In exemplary embodiments, the selective heating is achieved at least in part by selective delivery of light or other radiant energy to the second zone of the film.

In one particular embodiment, the turning film can be a microstructured film such as, for example, Vikuiti™ Image Directing Films, available from 3M Company. The turning film can include one plurality of parallel ridged microstructure shapes, or more than one different parallel ridged microstructure shapes, such as having a variety of included angles used to direct light in different directions, as described elsewhere.

Generally, the half angle in the along-duct direction of the emission through any light extraction element on a duct surface is approximately one-half the half angle of the collimation within the light duct, since typically only one-half of the rays within the cone of rays striking the void will exit the light duct. In some cases, it can be desirable to increase the half angle in the along-duct direction without altering the angular distribution emitted in the cross-duct direction. Increasing the half angle in the along-duct direction will elongate the segment of the emissive surface which makes a substantive contribution to the illuminance at any point on a target surface. This can in turn diminish the occurrence of shadows cast by objects near the surface, and may reduce the maximum luminance incident upon the surface, reducing the potential for glare. It generally is not acceptable to increase the half angle along the light duct by simply increasing the half angle within the light duct, as this would alter the cross-duct distribution and ultimately degrade the precision of cross-duct control.

For example, the along-duct distribution is centered approximately about normal for index-1.6, 69-degree turning prisms. It is centered about a direction with a small backward component (relative to the sense of propagation within the light duct) for included angles less than 69 degrees, and about a direction with a forward component for included angles greater than 69 degrees. Thus, a turning film composed of prisms with a plurality of included angles, including some less than 69 degrees and some greater than 69 degrees, can produce an along-duct distribution approximately centered about normal, but possessing a larger along-duct half angle than a film composed entirely of 69-degree prisms.

Returning now to FIG. 1, first, second, and third light conduits 110, 120, 180, and light diverter 170, can be fabricated from any material commonly used for architectural ductwork, including, for example sheet metals such as steel, galvanized sheet metals, aluminum, plastics and the like. In one particular embodiment, all of the interior surfaces 112, 122, 182, of first, second, and third light conduits 110, 120, 180; and reflective surface 132 of light diverter 170, are made from a material having a high specular reflectivity. A high specular reflectivity can enable efficient light transport along the considerable distances that can occur within architectural light ducts. In some embodiments, the highly specular reflectivity can be achieved using materials such as, for example, highly polished metals, metalized polymer films, and dielectric multilayer reflectors. In one particular embodiment, a multilayer optical film such as Vikuiti™ Enhanced Specular Reflector (ESR) film available from 3M Company can be a preferred material. Although light extraction can occur throughout the Tee-splitter, it can be seen that the presence of the first and second light diverters 130, 131 act as a shield that blocks the second intersection region bottom surface 194 within the light diverter 170, from any of the light propagating through the intersection region 117.

Figure 2A:
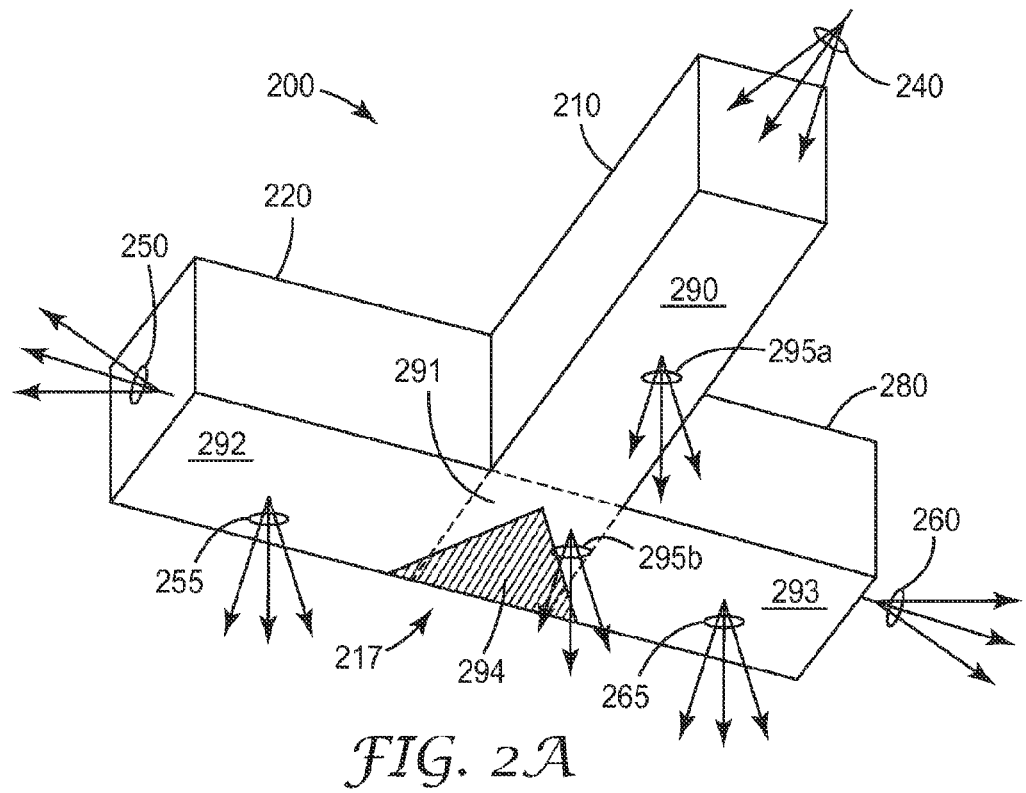
FIG. 2A shows a perspective schematic view of a shadowed light duct splitter.

FIG. 2A shows a perspective schematic view of a shadowed light duct splitter 200, such as one embodiment of light duct splitter 100 of FIG. 1, according to one aspect of the disclosure. Each of the elements 210-295 shown in FIG. 2A correspond to like-numbered elements shown in FIG. 1, which have been described previously. For example, first light conduit 210 in FIG. 2A corresponds to first light conduit 110 in FIG. 1, and so on. Shadowed light duct splitter 200 includes a first light conduit 210, a second light conduit 220, and a third light conduit 280 that meet in an intersection region 217. Collimated input light 240 enters first light conduit 210 and is split into a second light 250 travelling in the second light conduit 220 and a third light 260 travelling in the third light conduit 280.

In one particular embodiment, light extraction elements are disposed on each of the bottom surfaces of the shadowed light duct splitter 200, as described elsewhere. It is to be understood that the light extraction elements can be disposed on any or all of the surfaces of the shadowed light ducts splitter; however for brevity, as described herein, each of the bottom surfaces includes the extraction elements. As such, a portion of the light travelling in the shadowed light duct splitter 200 is extracted from the first conduit bottom surface 290 as extracted collimated light 295a, from the second conduit bottom surface 292 as extracted collimated second light 255, and from the third conduit bottom surface 293 as extracted collimated third light 265. A portion of the light travelling within the intersection region 217 is extracted from the intersection bottom surface 291 as extracted collimated light 295b; however, no light can be extracted from the shadowed intersection bottom surface 294, since this region is blocked from light (by the first and second light diverters 130, 131 as shown and described in FIG. 1). This shadowed intersection bottom surface 294 is an aesthetically unpleasing attribute of the light duct, and the reduction of light within the intersection region can also detract from the illumination of regions near the Tee-splitter.

Figure 2B:
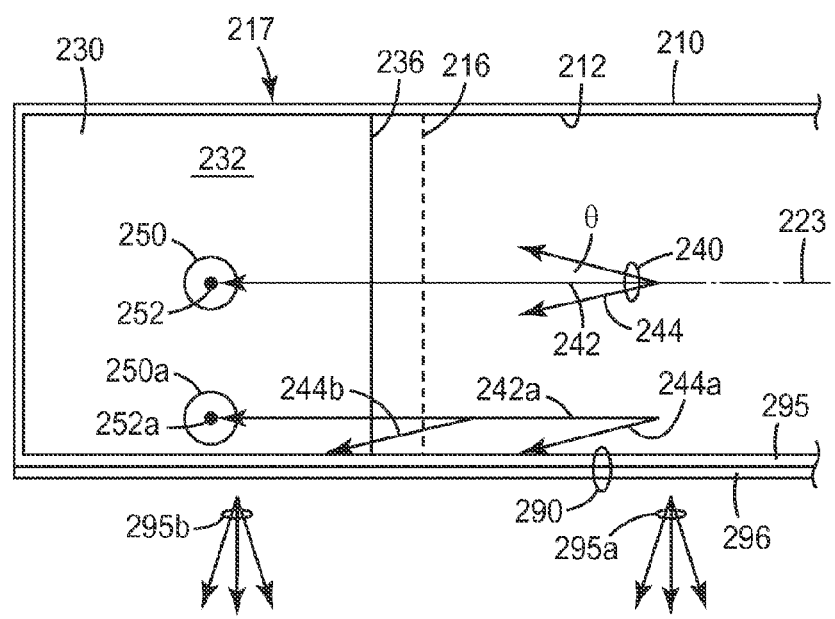
FIG. 2B shows a cross-sectional schematic through section A-A' of FIG. 1 for the shadowed light duct splitter of FIG. 2A.

FIG. 2B shows a cross-sectional schematic through section A-A' of FIG. 1 for the shadowed light duct splitter 200 of FIG. 2A, according to one aspect of the disclosure. Each of the elements 210-295 shown in FIG. 2B correspond to like-numbered elements shown in FIGS. 1 and 2A, which have been described previously. For example, first light conduit 210 in FIG. 2B corresponds to first light conduit 110, 210 in FIGS. 1 and 2A, and so on. Collimated input light 240 travels through first light conduit 210 having reflective inner surface 212. A central light ray 242 and a boundary light ray 244 within a collimation angle θ of the central light ray 242, propagate parallel to the central axis 223 of first light conduit 210.

Central light ray 242 passes through boundary 216 and past first edge 236 of first diverter 230 of intersection region 217, and reflects from reflective surface 232 of first diverter 230 as second light 250 having second central light ray 252 (and subsequently propagates through second light conduit 220, coming out of the paper). A parallel central light ray 242a passes through boundary 216 of intersection region 217 and also reflects from reflective surface 232. However, boundary light ray 244a intersects first conduit bottom surface 290 comprising perforated reflector 295 and turning film 296 and then subsequently leaves first light conduit 210 as extracted collimated light 295a, and boundary light ray 244b passes through boundary 216, enters intersection region 217, intersects first conduit bottom surface 290 comprising perforated reflector 295 and turning film 296, and subsequently leaves intersection bottom surface 291 of intersection region 217 as extracted collimated light 295b.

Figure 3A:
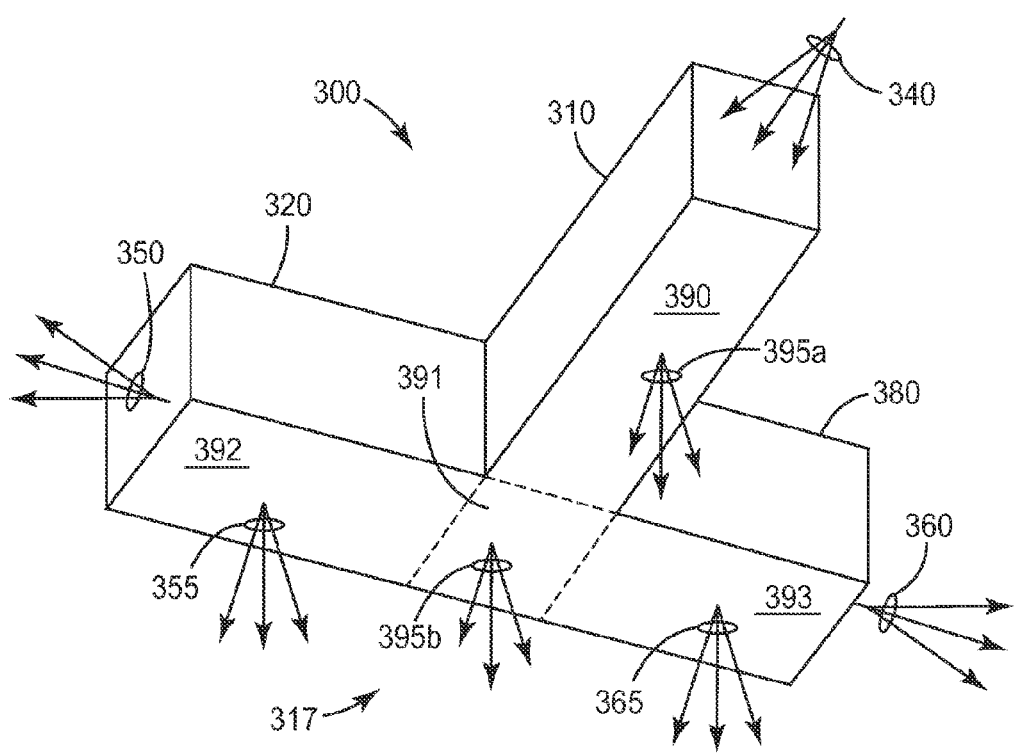
FIG. 3A shows a perspective schematic view of an illuminated light duct splitter.

FIG. 3A shows a perspective schematic view of a light duct splitter 300, such as one embodiment of light duct splitter 100 of FIG. 1, according to one aspect of the disclosure. Each of the elements 310-395 shown in FIG. 3A correspond to like-numbered elements shown in FIG. 1, which have been described previously. For example, first light conduit 310 in FIG. 3A corresponds to first light conduit 110 in FIG. 1, and so on. Light duct splitter 300 includes a first light conduit 310, a second light conduit 320, and a third light conduit 380 that meet in an intersection region 317. Collimated input light 340 enters first light conduit 310 and is split into a second light 350 travelling in the second light conduit 320 and a third collimated light 360 travelling in the third light conduit 380.

In one particular embodiment, light extraction elements are disposed on each of the bottom surfaces of the light duct splitter 300, as described elsewhere. It is to be understood that the light extraction elements can be disposed on any or all of the surfaces of the light duct splitter; however for brevity, as described herein, each of the bottom surfaces includes the extraction elements. As such, a portion of the light travelling in the light duct splitter 300 is extracted from the first conduit bottom surface 390 as extracted collimated light 395a, from the second conduit bottom surface 392 as extracted collimated second light 355, and from the third conduit bottom surface 393 as extracted collimated third light 365. A portion of the light travelling within the intersection region 317 is extracted from the intersection region bottom surface 391 as extracted collimated light 395b. The shadowed intersection bottom surface 294 as shown in FIG. 2A has been eliminated by the incorporation of a third diverter surface, as described below, thereby eliminating the aesthetically unpleasing attribute and also reduced illumination of the shadowed light duct splitter 200 of FIG. 2A.

Figure 3B:
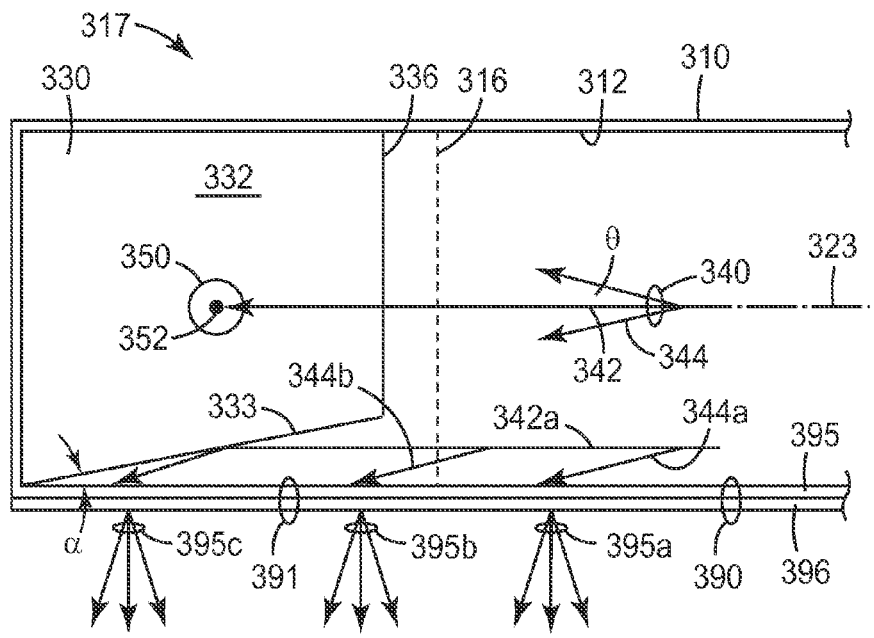
FIG. 3B shows a cross-sectional schematic through section A-A' of FIG. 1 for the illuminated light duct splitter of FIG. 3A.

FIG. 3B shows a cross-sectional schematic through section A-A' of FIG. 1 for the light duct splitter 300 of FIG. 3A, according to one aspect of the disclosure. Each of the elements 310-395 shown in FIG. 3B correspond to like-numbered elements shown in FIGS. 1 and 3A, which have been described previously. For example, first light conduit 310 in FIG. 3B corresponds to first light conduit 110, 310 in FIGS. 1 and 3A, and so on. Partially collimated input light 340 travels through first light conduit 310 having reflective inner surface 312. A central light ray 342 and a boundary light ray 344 within a collimation angle θ of the central light ray 342, propagate parallel to the central axis 323 of first light conduit 310.

Central light ray 342 passes through boundary 316 and past first edge 336 of first diverter 330 of intersection region 317, and reflects from reflective surface 332 of first diverter 330 as second light 350 having second central light ray 352 (and subsequently propagates through second light conduit 320, coming out of the paper). A parallel central light ray 342a passes through boundary 316 of intersection region 317, reflects from a third diverter reflective surface 333, and intersects intersection region bottom surface 391 comprising perforated reflector 395 and turning film 396 and then subsequently leaves intersection region 317 as extracted collimated light 395c. Third diverter reflective surface 333 is disposed at a third diverter angle it from the first conduit bottom surface 390, and contributes to the elimination of the shadowed intersection bottom surface 294 shown in FIG. 2A. Third diverter angle α can be any desired angle ranging from about 2 degrees to about 30 degrees, for example from about 5 degrees to about 25 degrees, or for example from about 10 degrees to about 20 degrees.

Boundary light ray 344a intersects first conduit bottom surface 390 and leaves the first light conduit 310 as extracted collimated light 395a, and boundary light ray 344b passes through boundary 316, enters intersection region 317, intersects intersection region bottom surface 391 comprising perforated reflector 395 and turning film 396, and subsequently leaves intersection region bottom surface 391 of intersection region 317 as extracted collimated light 395b.

Figure 3C:
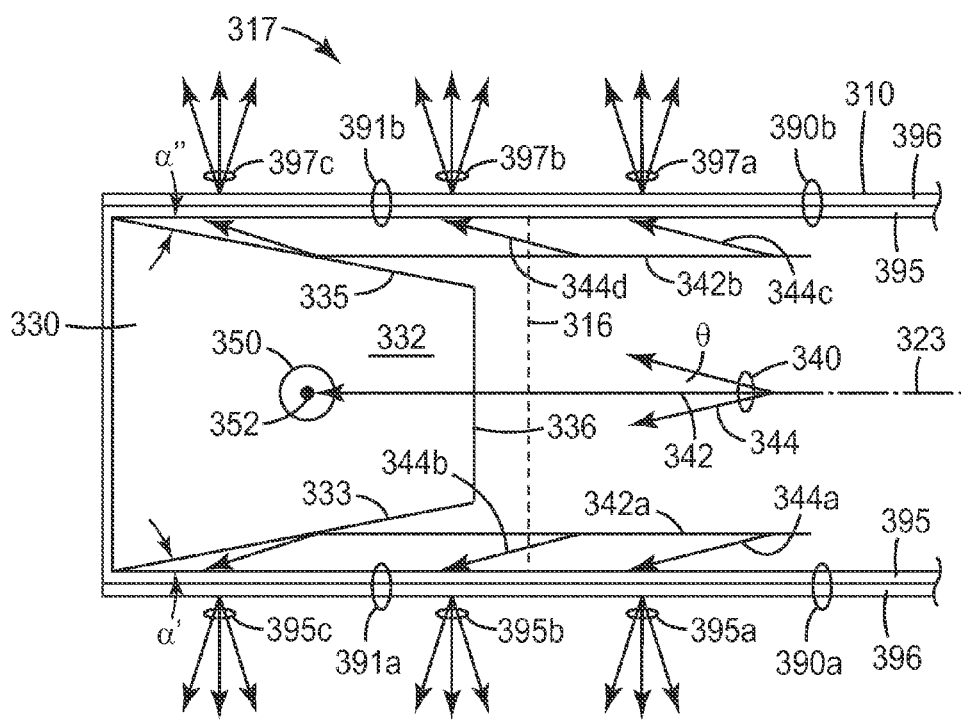
FIG. 3C shows a cross-sectional schematic through section A-A' of FIG. 1 for the illuminated light duct splitter of FIG. 3A having illumination from both top and bottom.

FIG. 3C shows a cross-sectional schematic through section A-A' of FIG. 1 for the light duct splitter 300 of FIG. 3A having illumination from both top and bottom, according to one aspect of the disclosure. Each of the elements 310-395 shown in FIG. 3C correspond to like-numbered elements shown in FIGS. 1 and 3B, which have been described previously. For example, first light conduit 310 in FIG. 3C corresponds to first light conduit 110, 310 in FIGS. 1 and 3B, and so on. Partially collimated input light 340 travels through first light conduit 310. A central light ray 342 and a boundary light ray 344 within a collimation angle θ of the central light ray 342, propagates parallel to the central axis 323 of first light conduit 310.

Central light ray 342 passes through boundary 316 and past first edge 336 of first diverter 330 of intersection region 317, and reflects from reflective surface 332 of first diverter 330 as second light 350 having second central light ray 352 (and subsequently propagates through second conduit 320, coming out of the paper). A parallel central light ray 342a passes through boundary 316 of intersection region 317, reflects from a third diverter reflective surface 333, and intersects intersection region bottom surface 391a comprising perforated reflector 395 and turning film 396 and then subsequently leaves intersection region 317 through intersection region bottom surface 391a as extracted collimated light 395c. Third diverter reflective surface 333 is disposed at a third diverter angle α' from the first conduit bottom surface 390a, and contributes to the elimination of the shadowed intersection bottom surface 294 shown in FIG. 2A. Third diverter angle α' can be any desired angle ranging from about 2 degrees to about 30 degrees, for example from about 5 degrees to about 25 degrees, or for example from about 10 degrees to about 20 degrees.

Boundary light ray 344a intersects first conduit bottom surface 390a and leaves the first light conduit 310 as extracted collimated light 395a, and boundary light ray 344b passes through boundary 316, enters intersection region 317, intersects intersection region bottom surface 391a comprising perforated reflector 395 and turning film 396, and subsequently leaves intersection region bottom surface 391a of intersection region 317 as extracted collimated light 395b.

A second parallel central light ray 342b passes through boundary 316 of intersection region 317, reflects from a fourth diverter reflective surface 335, and intersects intersection region top surface 391b comprising perforated reflector 395 and turning film 396 and then subsequently leaves intersection region 317 as extracted collimated light 397c. Fourth diverter reflective surface 335 is disposed at a fourth diverter angle α" from the first conduit top surface 390b, and contributes to the elimination of a shadowed region on the top of the intersection region 317. Fourth diverter angle α" can be any desired angle ranging from about 2 degrees to about 30 degrees, for example from about 5 degrees to about 25 degrees, or for example from about 10 degrees to about 20 degrees.

Boundary light ray 344c intersects first conduit top surface 390b and leaves the first light conduit 310 as extracted collimated light 397a, and boundary light ray 344d passes through boundary 316, enters intersection region 317, intersects intersection region top surface 391b comprising perforated reflector 395 and turning film 396, and subsequently leaves the intersection region top surface 391b of intersection region 317 as extracted collimated light 397b.

Following are a list of embodiments of the present disclosure.

Item 1 is an illuminated light duct splitter, comprising: a first light conduit defining a light transport cavity capable of transporting light along a first propagation direction; a second light conduit defining a first light diversion cavity and a second propagation direction perpendicular to the first propagation direction; a third light conduit defining a second light diversion cavity and a third propagation direction parallel and opposite the second propagation direction, the second and the third light conduit intersecting the first light conduit such that the light transport cavity and the first and the second light diversion cavities are contiguous in an intersection region; and a light diverter disposed at a diverter angle to the first propagation direction and parallel to the second and the third propagation direction, the light diverter capable of reflecting incident light propagating within the collimation angle θ of the first propagation direction to intersect a bottom surface of the intersection region.

Item 2 is the illuminated light duct splitter of item 1, wherein the bottom surface of the intersection region comprises a reflector having a plurality of voids, a turning film, or a reflector having a plurality of voids and a turning film.

Item 3 is the illuminated duct splitter of item 2, wherein the turning film comprises parallel vee-grooves adjacent the bottom surface of the intersection region and oriented perpendicular to the first propagation direction.

Item 4 is the illuminated light duct splitter of item 1 to item 3, further comprising a second light diverter disposed at a second diverter angle to the first propagation direction and parallel to the second and the third propagation direction, the second light diverter capable of reflecting incident light propagating within the collimation angle θ of the first propagation direction to intersect a top surface of the intersection region.

Item 5 is the illuminated light duct splitter of item 1 to item 4, wherein the top surface of the intersection region comprises a reflector having a plurality of voids, a turning film, or a reflector having a plurality of voids and a turning film.

Item 6 is the illuminated light duct splitter of item 5, wherein the turning film comprises parallel vee-grooves adjacent the top surface of the intersection region and oriented perpendicular to the first propagation direction.

Item 7 is the illuminated light duct splitter of item 1 to item 6, wherein at least one of the first, the second, and the third light conduits, exclusive of the intersection region, include a reflector having a plurality of voids.

Item 8 is the illuminated light duct splitter of item 1 to item 7, wherein at least one of the first, the second, and the third light conduits, exclusive of the intersection region, includes a turning film adjacent the reflector and having parallel vee-grooves oriented perpendicular to the first, the second, and the third propagation direction, respectively.

Item 9 is an illuminated light duct splitter, comprising: a first light conduit defining a light transport cavity capable of transporting light along a first propagation direction; a second light conduit defining a first light diversion cavity; a third light conduit defining a second light diversion cavity, the second and the third light conduit intersecting the first light conduit such that the light transport cavity and the first and the second light diversion cavities are contiguous in an intersection region; a light diverter, comprising: a first reflector disposed at a first diverter angle to the first propagation direction; a second reflector disposed at a second diverter angle to the first propagation direction, the first and the second reflectors intersecting at a first edge; and a third reflector perpendicular to the first and second reflector and at a third diverter angle to the first propagation direction, intersecting a bottom surface of the intersection region and the first edge, wherein a first light ray propagating within a collimation angle θ of the first propagation direction that intersects the first reflector is diverted to a second light ray propagating within the collimation angle θ of a second propagation direction in the second light conduit, wherein a third light ray propagating within the collimation angle θ of the first propagation direction that intersects the second reflector is diverted to a fourth light ray propagating within the collimation angle θ of a third propagation direction in the third light conduit, and wherein a fifth light ray propagating within the collimation angle θ of the first propagation direction that intersects the third reflector is diverted to a sixth light ray intersecting the bottom surface of the intersection region.

Item 10 is the illuminated light duct splitter of item 9, wherein the first diverter angle and the second diverter angle each comprise an angle of approximately 45 degrees, and the second and third propagation directions are collinear and each perpendicular to the first propagation direction.

Item 11 is the illuminated light duct splitter of item 9 to item 10, wherein the bottom surface of the intersection region comprises a reflector having a plurality of voids, a turning film, or a reflector having a plurality of voids and a turning film.

Item 12 is the illuminated duct splitter of item 11, wherein the turning film comprises parallel vee-grooves adjacent the bottom surface of the intersection region and oriented perpendicular to the first propagation direction.

Item 13 is the illuminated light duct splitter of item 9 to item 12, wherein the first edge is disposed within a region bounded by the intersection of the light transport cavity and the first and the second light diversion cavities.

Item 14 is the illuminated light duct splitter of item 9 to item 13, wherein the first reflector extends between the first edge and the first light diversion cavity, and the second reflector extends between the first edge and the second light diversion cavity.

Item 15 is the illuminated light duct splitter of item 9 to item 14, wherein the first edge is positioned along a centerline of the light transport cavity.

Item 16 is the illuminated light duct splitter of item 9 to item 15, wherein the collimation angle is between about 0 degrees and about 30 degrees.

Item 17 is the illuminated light duct splitter of item 9 to item 16, wherein the first edge of the light diverter is disposed within a boxed region defined by an output cross section of the first light conduit, a first input cross section of the second light conduit, and a second input cross section of the third light conduit.

Item 18 is the illuminated light duct splitter of item 9 to item 17, wherein a second edge of the light diverter is disposed in the first light diversion cavity outside of the boxed region, and a third edge of the light diverter is disposed in the second light diversion cavity outside of the boxed region.

Item 19 is the illuminated light duct splitter of item 9 to item 18, wherein each of the first and the second diverter angles, and each of the first and the second reflectors can be independently adjusted so that a variable portion of light travelling though the light transport cavity can be diverted to the first and the second light diversion cavities.

Item 20 is the illuminated light duct splitter of item 9 to item 19, wherein the first propagation direction is perpendicular to the second propagation direction and the third propagation direction.

Item 21 is the illuminated light duct splitter of item 9 to item 20, wherein the second propagation direction is collinear with the third propagation direction.

Item 22 is the illuminated light duct splitter of item 9 to item 21, wherein at least one of the first, the second, and the third light conduits, exclusive of the intersection region, include a reflector having a plurality of voids.

Item 23 is the illuminated light duct splitter of item 9 to item 22, wherein at least one of the first, the second, and the third light conduits, exclusive of the intersection region, includes a turning film adjacent the reflector and having parallel vee-grooves oriented perpendicular to the first, the second, and the third propagation direction, respectively.

Item 24 is the illuminated light duct splitter of item 9 to item 23, wherein at least one of the first, the second, and the third light conduits, exclusive of the intersection region, includes a reflector having a plurality of voids and a turning film adjacent the reflector and having parallel vee-grooves oriented perpendicular to the first, the second, and the third propagation direction, respectively.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An illuminated light duct splitter, comprising:
   a first light conduit defining a light transport cavity capable of transporting light along a first propagation direction;
   a second light conduit defining a first light diversion cavity and a second propagation direction perpendicular to the first propagation direction;
   a third light conduit defining a second light diversion cavity and a third propagation direction parallel and opposite the second propagation direction, the second and the third light conduit intersecting the first light conduit such that the light transport cavity and the first and the second light diversion cavities are contiguous in an intersection region;
   a light diverter, comprising:
      a first reflector disposed at a first diverter angle to the first propagation direction and parallel to the second and the third propagation direction, the first reflector capable of reflecting incident light propagating within a collimation angle θ of the first propagation direction to intersect a bottom surface of the intersection region; and
   one or more light extraction elements on the bottom surface of the intersection region.

2. The illuminated light duct splitter of claim 1, wherein the one or more light extraction elements comprises a second reflector having a plurality of voids, a turning film capable of extracting the reflected incident light, or a second reflector having a plurality of voids and a turning film capable of extracting the reflected incident light.

3. The illuminated light duct splitter of claim 2, wherein the turning film comprises parallel vee-grooves adjacent the bottom surface of the intersection region and oriented perpendicular to the first propagation direction.

4. The illuminated light duct splitter of claim 1, wherein the light diverter further comprises a third reflector disposed at a second diverter angle to the first propagation direction and parallel to the second and the third propagation direction, the third reflector capable of reflecting incident light propagating within the collimation angle θ of the first propagation direction to intersect a top surface of the intersection region.

5. The illuminated light duct splitter of claim 1, wherein the top surface of the intersection region comprises a fourth reflector having a plurality of voids, a turning film, or a reflector having a plurality of voids and a turning film.

6. The illuminated light duct splitter of claim 5, wherein the turning film comprises parallel vee-grooves adjacent the top surface of the intersection region and oriented perpendicular to the first propagation direction.

7. The illuminated light duct splitter of claim 1, wherein at least one of the first, the second, and the third light conduits, exclusive of the intersection region, include a fifth reflector having a plurality of voids.

8. The illuminated light duct splitter of claim 7, wherein at least one of the first, the second, and the third light conduits, exclusive of the intersection region, includes a turning film adjacent the fifth reflector and having parallel vee-grooves oriented perpendicular to the first, the second, and the third propagation direction, respectively.

9. An illuminated light duct splitter, comprising:
   a first light conduit defining a light transport cavity capable of transporting light along a first propagation direction;
   a second light conduit defining a first light diversion cavity;
   a third light conduit defining a second light diversion cavity, the second and the third light conduit intersecting the first light conduit such that the light transport cavity and the first and the second light diversion cavities are contiguous in an intersection region;
   a light diverter, comprising:
      a first reflector disposed at a first diverter angle to the first propagation direction;
      a second reflector disposed at a second diverter angle to the first propagation direction, the first and the second reflectors intersecting at a first edge; and
      a third reflector perpendicular to the first and second reflector and at a third diverter angle to the first propagation direction, intersecting a bottom surface of the intersection region and the first edge; and
   one or more light extraction elements on the bottom surface of the intersection region,
   wherein a first light ray propagating within a collimation angle θ of the first propagation direction that intersects the first reflector is diverted to a second light ray propagating within the collimation angle θ of a second propagation direction in the second light conduit,
   wherein a third light ray propagating within the collimation angle θ of the first propagation direction that intersects the second reflector is diverted to a fourth light ray propagating within the collimation angle θ of a third propagation direction in the third light conduit, and
   wherein a fifth light ray propagating within the collimation angle θ of the first propagation direction that intersects the third reflector is diverted to a sixth light ray intersecting the bottom surface of the intersection region.

10. The illuminated light duct splitter of claim 9, wherein the first diverter angle and the second diverter angle each comprise an angle of approximately 45 degrees, and the second and third propagation directions are collinear and each perpendicular to the first propagation direction.

11. The illuminated light duct splitter of claim 9, wherein the one or more light extraction elements comprises a fourth reflector having a plurality of voids, a turning film capable of extracting the sixth light ray, or a fourth reflector having a plurality of voids and a turning film capable of extracting the sixth light ray.

12. The illuminated light duct splitter of claim 11, wherein the turning film comprises parallel vee-grooves adjacent the bottom surface of the intersection region and oriented perpendicular to the first propagation direction.

13. The illuminated light duct splitter of claim 9, wherein the first edge is disposed within a region bounded by the intersection of the light transport cavity and the first and the second light diversion cavities.

14. The illuminated light duct splitter of claim 9, wherein the first reflector extends between the first edge and the first light diversion cavity, and the second reflector extends between the first edge and the second light diversion cavity.

15. The illuminated light duct splitter of claim 9, wherein the first edge is positioned along a centerline of the light transport cavity.

16. The illuminated light duct splitter of claim 9, wherein the collimation angle is between about 0 degrees and about 30 degrees.

17. The illuminated light duct splitter of claim 9, wherein the first edge of the light diverter is disposed within a boxed region defined by an output cross section of the first light conduit, a first input cross section of the second light conduit, and a second input cross section of the third light conduit.

18. The illuminated light duct splitter of claim 17, wherein a second edge of the light diverter is disposed in the first light diversion cavity outside of the boxed region, and a third edge of the light diverter is disposed in the second light diversion cavity outside of the boxed region.

19. The illuminated light duct splitter of claim 9, wherein each of the first and the second diverter angles, and each of the first and the second reflectors can be independently adjusted so that a variable portion of light travelling though the light transport cavity can be diverted to the first and the second light diversion cavities.

20. The illuminated light duct splitter of claim 9, wherein the first propagation direction is perpendicular to the second propagation direction and the third propagation direction.

21. The illuminated light duct splitter of claim 9, wherein the second propagation direction is collinear with the third propagation direction.

22. The illuminated light duct splitter of claim 9, wherein at least one of the first, the second, and the third light conduits, exclusive of the intersection region, include a fifth reflector having a plurality of voids.

23. The illuminated light duct splitter of claim 22, wherein at least one of the first, the second, and the third light conduits, exclusive of the intersection region, includes a turning film adjacent the fifth reflector and having parallel vee-grooves oriented perpendicular to the first, the second, and the third propagation direction, respectively.

24. The illuminated light duct splitter of claim 9, wherein at least one of the first, the second, and the third light conduits, exclusive of the intersection region, includes a sixth reflector having a plurality of voids and a turning film adjacent the reflector and having parallel vee-grooves oriented perpendicular to the first, the second, and the third propagation direction, respectively.

\* \* \* \* \*